United States Patent [19]

Spannagel

[11] 3,814,925

[45] June 4, 1974

[54] DUAL OUTPUT ADDER AND METHOD OF ADDITION FOR CONCURRENTLY FORMING THE DIFFERENCES A–B AND B–A

[75] Inventor: Ulrich Spannagel, Los Altos, Calif.

[73] Assignee: Amdahl Corporation, Sunnyvale, Calif.

[22] Filed: Oct. 30, 1972

[21] Appl. No.: 302,225

[52] U.S. Cl. .................................. 235/175, 235/177

[51] Int. Cl. .................................................. G06f 7/50

[58] Field of Search ............................ 235/177, 175

[56] References Cited

UNITED STATES PATENTS 3,700,875 10/1972 Saenger et al. ..................... 235/175

OTHER PUBLICATIONS

J. Earle, "Exponent Differences & Preshifter", IBM Tech. Disclosure Bulletin Vol. 9 No. 7 Dec. 1966 pp. 848–849.

G. G. Langdon, Jr., "Subtraction by Minvend Complementation" IEEE Trans. on Computers Jan. 1969 pp.74–76.

M. S. Schmookler, "Group-Carry Generator" IBM Tech. Disclosure Bulletin Vol. 6 No. 1 June 1963 pp. 77–78.

*Primary Examiner*—Felix D. Gruber
*Assistant Examiner*—David H. Malzahn
*Attorney, Agent, or Firm*—Flehr, Hohbach, Test, Albritton & Herbert

[57] ABSTRACT

Disclosed is an adder and a method of addition for use in a data processing system. The adder concurrently produces from operands A and B dual outputs which are the difference A–B and the difference B–A. The dual outputs from the adder are used in exponent arithmetic where the smaller operand is subtracted from the larger operand. At the time the subtraction commences it is not known which operand, A or B, is larger and therefore whether A–B or B–A is desired. The dual output adder insures that the desired subtraction, either A–B or B–A, is available at a time which does not delay processing of the exponent arithmetic instruction.

11 Claims, 4 Drawing Figures

DUAL OUTPUT ADDER AND METHOD OF ADDITION FOR CONCURRENTLY FORMING THE DIFFERENCES A—B AND B—A

CROSS REFERENCE TO RELATED APPLICATIONS

1. DATA PROCESSING SYSTEM, Ser. No. 302,221, filed Oct. 30, 1972, invented by Gene M. Amdahl and Glen D. Grant and assigned to AMDAHL CORPORATION.

2. RIGHT AND LEFT SHIFTER AND METHOD IN A DATA PROCESSING SYSTEM, Ser. No. 302,227, filed Oct. 30, 1972, invented by Gene M. Amdahl, Michael R. Clements and Lyle C. Topham and assigned to AMDAHL CORPORATION.

BACKGROUND OF THE INVENTION

The present invention relates to the field of data processing systems and specifically to the field of adders typically found within the execution units of data processing systems.

Data processing systems employ adders for many different types of algebraic additions. Of particular interest is floating point arithmetic where the operands A and B are each divided into three parts. Specifically, a sign part, a mantissa part and an exponent part. In the system of the above referenced application Ser. No. 302,221, for example, each operand A and B is a single word comprised of 4 bytes with 8 bits per byte. One bit of the left-hand byte defines the sign and the remaining 7 bits of that byte define the magnitude of the exponent. The remaining 3 bytes, 24 bits, define the mantissa associated with the sign and the exponent of the first byte. For a double-word operand, the additional 4 bytes, 32 bits, are combined with the 3 bytes from the first word to define the mantissa.

In order to add or subtract two floating point operands, the mantissas are first aligned so that positions having the same weight will be properly added. The alignment is determined by the value of the exponent so that before alignment is carried out, the smaller exponent is subtracted from the larger exponent to determine the amount of shift for proper alignment. For operands A and B in general, it is not known whether A is greater than B or whether B is greater than A or whether they are equal.

Prior art systems which are designed for high speed operation have generally performed both the subtraction A—B and the subtraction B—A so that the appropriate one of the two results will be available at the earliest time at which the data processing system can use the result without unnecessarily adding to the execution time.

Prior art apparatus for carrying out the above operations has generally required two or more functional units. Typically, one functional unit, an adder, performs the A—B subtraction and another functional unit performs the B—A subtraction. The use of different adders permits the subtraction of exponents within one cycle of the processing unit without adding to the execution time but the use of two adders instead of one is unnecessarily redundant. While the two subtractions can be performed using only one adder by doing the first subtraction A-B in a first cycle and the second subtraction B-A in a second cycle, this latter approach is also undesirable since it doubles the execution time.

SUMMARY OF THE INVENTION

The present invention is an adder and a method of addition for use in a data processing system. The adder having input operands A and B concurrently produces dual outputs which are the difference A—B and the difference B—A.

The adder and method of the present invention concurrently employs 1's complement arithmetic and 2's complement arithmetic using common circuitry in a single adder to form dual outputs. Specifically, the A—B difference is produced by adding the 2's complement B'' of B to A, that is, $A-B = A+B'' = A+B'+1$. The B—A difference is obtained by adding to A the 1's complement B' of B and taking the 1's complement $(A+B')'$ of the result, that is, $B-A = (A+B')'$.

The present invention achieves the object of producing the dual differences A—B and B—A concurrently without the necessity of increased processing time and without unnecessarily redundant hardware.

Additional objects and features of the invention will appear from the following description in which the preferred embodiments of the invention have been set forth in detail in conjunction with the drawings.

DESCRIPTION OF THE PREFERRED EMBODIMENTS

Overall System

Figure 1:
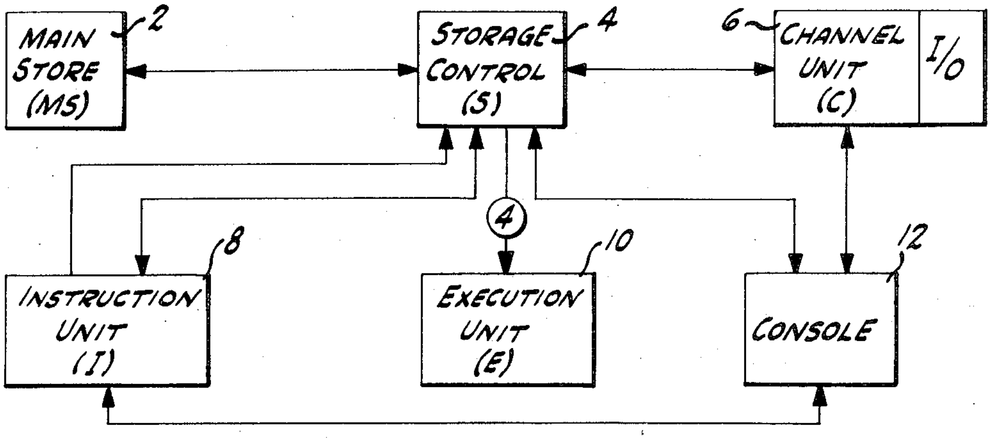
FIG. 1 depicts a block diagram of a basic environmental system suitable for employing the adder and addition method of the present invention.

In FIG. 1, a basic environmental data processing system is shown which is suitable for employing the adder and method of the present invention. Briefly, that system includes a main store 2, a storage control unit 4, an instruction unit 8, an execution unit 10, a channel unit 6 with associated I/O, and a console 12. In accordance with well known principles, the data processing system of FIG. 1 operates under control of a stored program of instructions. Typically, instructions and the data upon which the instructions operate are introduced from the I/O equipment via the channel unit 6 through the storage control unit 4 into the main store 2. From the main store 2, instructions are fetched by the instruction unit 8 through the storage control 4, and are decoded so as to control the execution within the execution unit 10. Execution unit 10 executes instructions decoded in the instruction unit 8 and operates upon data communicated to the execution unit from the appropriate places in the system.

Execution unit 10 includes an adder for executing certain instructions of the system of FIG. 1, particularly instructions requiring the addition of operands in accordance with the rules of exponent arithmetic. The execution unit 10, and particularly the adder, are hereinafter described in detail. By way of general background and for specific details relating to the operation of the basic environmental system of FIG. 1, reference is made to the above identified application Ser. No. 302,221.

Execution Unit

Figure 2:
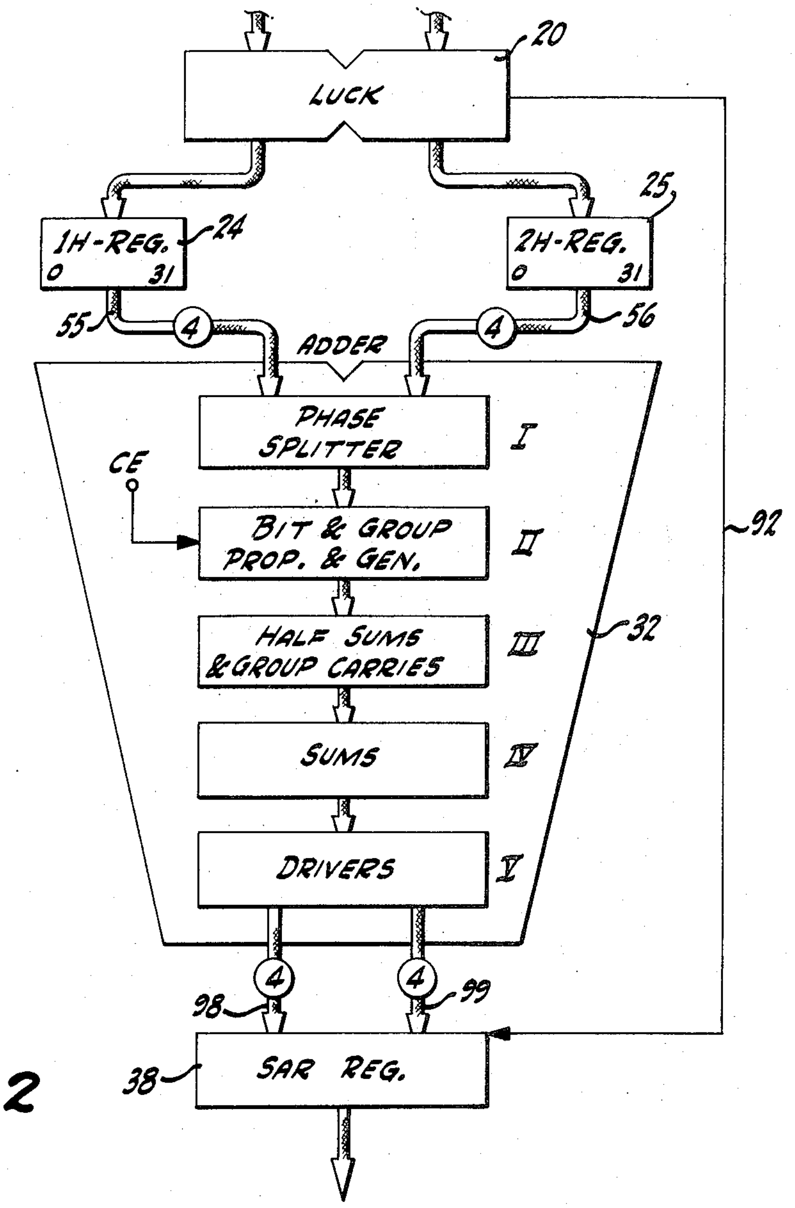
FIG. 2 depicts a schematic representation of the data paths associated with the adder of the present invention as it appears within the execution unit of the system of FIG. 1.

In FIG. 2, the basic data paths, within the execution unit 10, are shown which are associated with the adder 32 of the present invention. Briefly, data to be added is communicated to the adder 32 through the LUCK 20 to the 1H register 24 and the 2H register 25.

Figure 3:
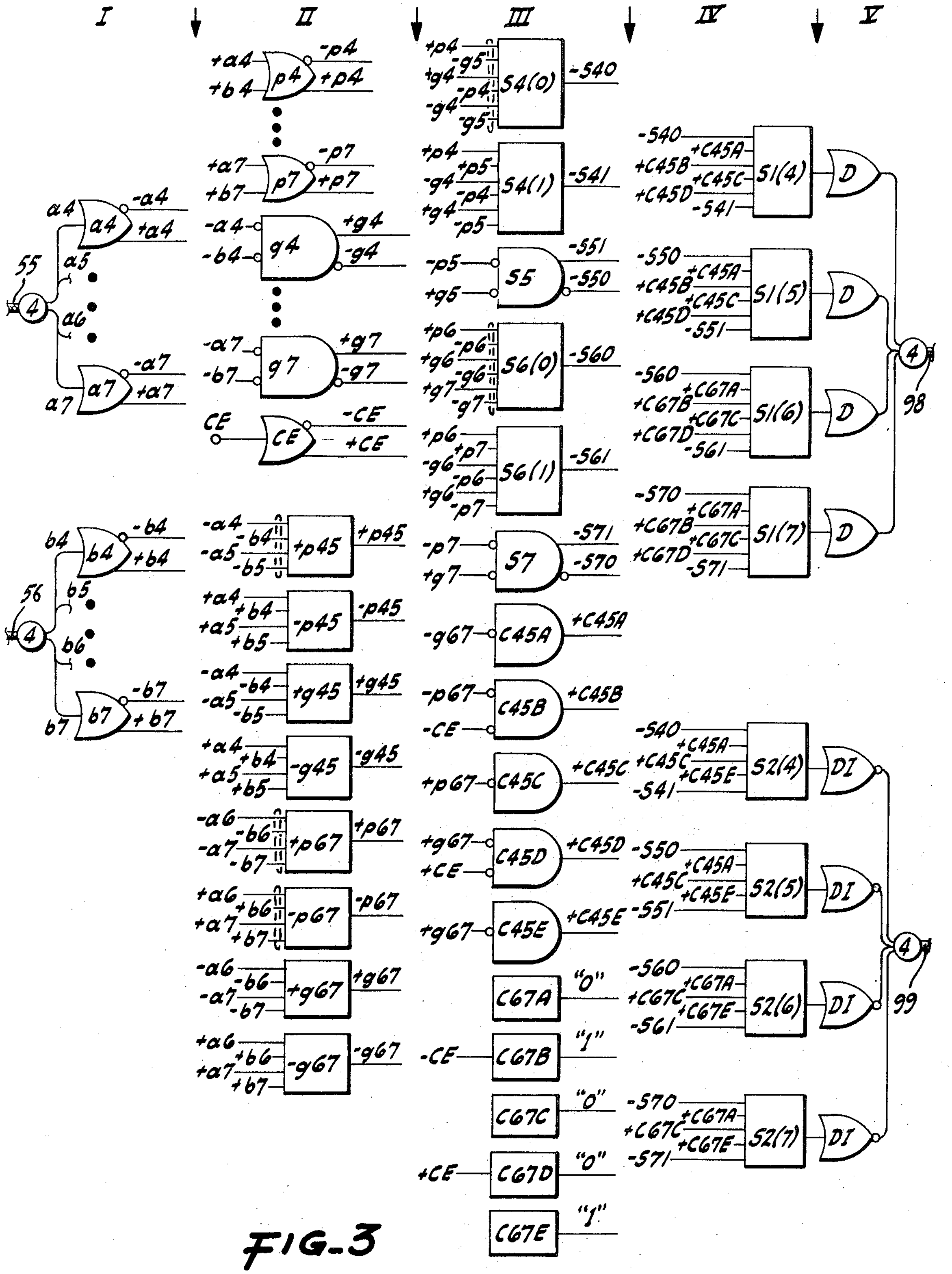
FIG. 3 depicts a schematic representation of the five logic levels associated with the adder of FIG. 2.

While the 1H register 24 and the 2H register 25 are each 32 bits wide, labeled 0 through 31 in FIG. 2, only one half byte comprising 4 bits is added in connection with a representative example of the present invention. Specifically, the 1H and the 2H registers each store one word, equal to four 8 bit bytes of data. Only one of the four bytes in each register is described in connection with the present invention. Operand A is stored in the 1H register 24 in bit positions 4 through 7 which produce inputs *a*4 through *a*7. Similarly, operand B is stored in 2H register 25 in bit positions 4 through 7 which produce inputs *b*4 through *b*7. Registers 1H and 2H provide both the direct outputs A and B or the inverse (one's complement) outputs A′ and B′. In connection with the present invention, the 1H register provides the direct output, A, on bus 55. In FIG. 3, bits *a*4, *a*5, . . . , *a*7 represent therefore the bits of A. The 2H register, in the present invention, provides the inverse output, B′, on bus 56. In FIG. 3, bits *b*4, *b*5, . . . , *b*7 represent, therefore, the bits of B′. At an appropriate time in the cycle of the data processing system of FIG. 1, operands A and B′ are gated to the adder 32 of FIG. 2 and the difference A—B appears on the 4-bit output bus 98 while the difference B—A appears on the 4-bit output bus 99.

At an appropriate time within the cycle of the data processing system, a determination of whether the operand A is larger than the operand B or vice versa occurs. When that determination is made, a signal on line 92 selects the appropriate one of the output busses 98 or 99 for ingating the selected difference into the SAR register 38 for further use by the system of FIG. 1. The signal on line 92 is derived, in one embodiment, from LUCK unit 20 which performs logical comparisons. Alternatively, the line 92 may be derived from higher order bits of adder 32 when they are employed.

The execution unit 10 also includes a shifter for shifting the mantissa portions of operands A and B in response to the selected difference A—B or B—A in carrying out the exponent arithmetic alignment. Further details as to the shifter may be obtained from the above referenced application Ser. No. 302,227.

Adder

Referring to FIG. 2, adder 32 is comprised of five logic levels I through V and is of the carry propagate type. The level I logic forms the plus and minus phases of the input signals. Bit propagate and bit generate signals and group propagate and group generate signals are produced in the level II logic. In the level III logic, the signals from the second level are logically combined to form the half-sum signals and the group carry signals. In the level IV logic, the full sums are produced from the signals of the level III logic. The level V logic is a power level for the A—B difference and a power level and inverter for the B—A difference.

In accordance with the present invention, a carry input CE is introduced by the level II logic for the purpose of adding +1 to form the two's complement in connection with that portion of the adder 32 which produces the A—B difference.

Referring to FIG. 3, specific details of logic levels I through V are shown organized in five columns. In FIG. 3, the 4-bit input busses 55 and 56 and the 4-bit output busses 98 and 99 correspond to the like-numbered input and output busses of adder 32 in FIG. 2. The input bus 55 transmits the operand A, comprised of bits *a*4, . . . , *a*7. In a similar manner, the input bus 56 transmits operand B which is comprised of bits *b*4, . . . , *b*7. The values of *b*4, . . . , *b*7 on bus 56 are the inverse of the data, actually stored in register 25 so that actually the input to adder 32 is B′, the one's complement of B.

The level I logic, comprised of the OR/NOR gates *a*4 through *a*7 and *b*4 through *b*7, functions to form the positive and negative phases of each of the single phase input bits on busses 55 and 56. Specifically, for the A operand bit *a*4, the OR/NOR gate a4 produces output +*a*4 and —*a*4. The 16 output signals from the level I logic in FIG. 3 serve as the inputs to the level II logic of FIG. 3.

The level II logic includes the bit propagate OR/NOR gates *p*4 through *p*7. The *p*4 OR/NOR gate is typical and receives the +*a*4 and +*b*4 inputs to generate the bit propagate signals +*p*4 and —*p*4. The level II logic also includes the bit generate gates comprised of the NOR-/OR gates *g*4 through *g*7. The NOR/OR gate *g*4 receives the —*a*4 and —*b*4 inputs to generate the —*g*4 and +*g*4 outputs.

In addition to the bit propagate and bit generate gates, the level II logic includes the group propagate and the group generate logic circuits. Specifically, the level II logic includes the group propagate circuits +*p*45, —*p*45, +*p*67, and —*p*67 and the group generate logic circuits +*g*45, —*g*45, +*g*67, and —*g*67.

Figure 4:
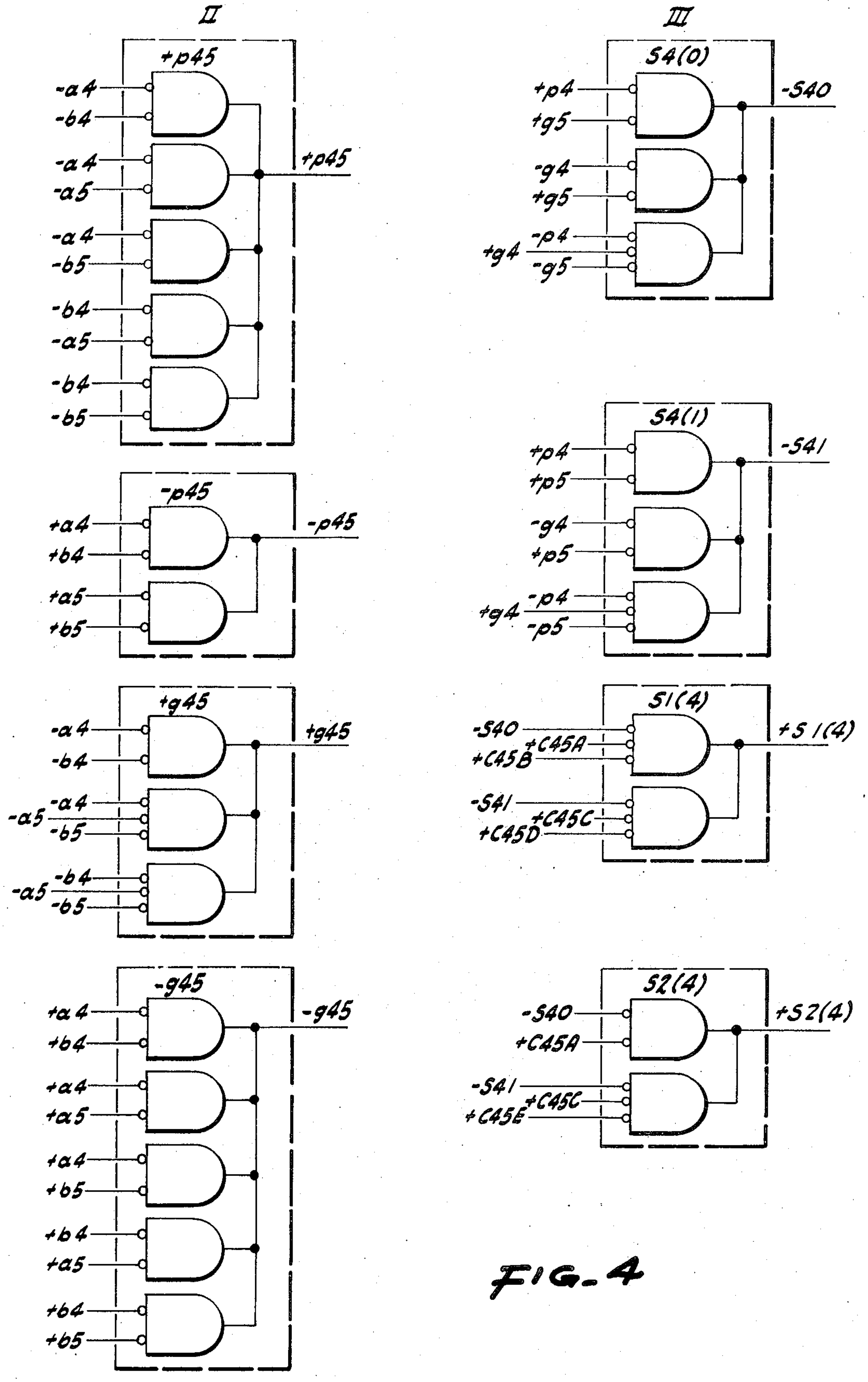
FIG. 4 depicts further details of representative logic blocks schematically represented in FIG. 3.

The group propagate logic circuit +*p*45, receiving as inputs the lines —*a*4, —*b*4, —*a*5 and —*b*5, is typical and is shown in further detail in FIG. 4. In FIG. 4, the +*p*45 group propagate logic circuit includes five NOR gates having the pairs of inputs —*a*4 and —*b*4, —*a*4 and —*a*5, —*a*4 and —*b*5, —*b*4 and —*a*5, —*b*4 and —*b*5, respectively. The +*p*67 group propagate logic circuit is analogous to the +*p*45 group propagate logic circuit. Specifically, the postscript 4 inputs for the latter are changed to postscript 6 inputs to produce the former while the postscript 5 inputs are changed to postscript 7 inputs.

Referring again to FIG. 3 and specifically the level II logic, the —*p*45 logic circuit includes the +*a*4, +*b*4, +*a*5, and +*b*5 inputs from the level I logic. Referring to FIG. 4, the —*p*45 logic circuit is shown as typical and includes two, two-input NOR gates receiving, respectively, +*a*4 and +*b*4 inputs and +*a*5 and +*b*5 inputs and having their outputs connected in common to form a logical OR. Again, the —*p*67 logic circuit of FIG. 3 is obtained from the —*p*48 logic circuit of FIG. 4 by substituting the postscript 6 for 4 and the postscript 7 for 5.

Referring again to FIG. 3, the +*g*45 group generate logic circuit receives the inputs, from logic level I, —*a*4, —*b*4, —*a*5, and —*b*5. Referring to FIG. 4, the +*g*45 logic circuit is comprised of the three NOR gates having inputs —*a*4, —*b*4 and —*a*4, —*a*5, —*b*5 and —*b*4, —*a*5, —*b*5, respectively which have their outputs connected in common to form a logical OR. In a manner analogous to that previously indicated, the group generate logic circuit $+g67$ is derived from the $+g45$ logic circuit by substituting postscript 4 inputs with postscript 6 inputs and substituting postscript 5 inputs with postscript 7 inputs.

In FIG. 3, the group generate logic circuit $-g45$ receives inputs $+a4$, $+b4$, $+a5$ and $+b5$ from logic level I. In FIG. 4, the logic circuit $-g45$ is indicated as comprised of the five two-input NOR gates having inputs $+a4$ and $+b4$, $+a4$ and $+a5$, $+a4$ and $+b5$, $+b4$ and $+a5$, and $+b4$ and $+b5$, respectively. In a similar manner, the $-g67$ group generate logic circuit is formed by substituting 6 and 7 postscript inputs for the 4 and 5 inputs of $-g45$, respectively.

In addition to the group and bit propagate and generate circuits of the level II logic of FIG. 3, the level II logic includes an input CE and a phase splitting NOR/OR gate for generating +CE and −CE carry inputs to add +1 to the sum $(A + B')$ to effectively form the two's complement of B in connection with the group carry signals of the level III logic. Referring to FIG. 3 and to the level III logic, the half sum logic circuits S4(0), S4(1) through S7 are shown along with the group carry circuits C45A through C45E and C67A through C67E. The two's complement carry from the logic gate CE of logic level II is introduced into the group carry logic circuits C45B, C45D and C67B and C67D of level III. By appropriate introduction of group carries into the final sums of the level IV logic, the two's complement is formed in connection with the A − B difference of the present invention.

Still referring to FIG. 3, the level III logic is comprised of the half sum circuits and the group carry circuits. The half sum logic block S4(0) includes as inputs from the level II logic $+p4$, $-g5$, $+g4$, $-p4$, $-g4$ and $-g5$. Referring to FIG. 4, further detail of the S4(0) logic block indicates that it is comprised of the three NOR gates having inputs $+p4$ and $+g5$, $-g4$ and $+g5$, the three inputs $-p4$, $+g4$ and $-g5$, respectively. The outputs of those three NOR gates are connected in common to form a logical OR function to produce the signal −S40. In the manner previously indicated, the −S60 half sum logic circuit, as referred to in FIG. 3, is produced by substitution of the postscript reference numbers indicated in the drawings.

Referring now to FIG. 3 and FIG. 4, the half sum logic gate S4(1) for producing the half sum signal −S4(1) includes three NOR gates having the inputs $+p4$ and $+p5$, $-g4$ and $+p5$ and the three inputs $-p4$, $+g4$ and $-p5$, respectively. In a similar manner, the half sum logic circuit S6(1) is derived by the postscript substitution indicated in the drawings. The half sum logic circuits S5 and S7 are comprised of the NOR/OR logic gates having the inputs $-p5$ and $+g5$ and $-p7$ and $+g7$, respectively.

Still referring to FIG. 3 and to the level III logic, the group carry logic circuits C45A through C45E are each comprised of NOR gates where the group carry signals C45B and C45D each receive the two's complement inputs −CE and +CE, respectively. The −CE signal is logically combined with the $-p67$ signal and the +CE signal is logically combined with the $+g67$ signal. The uncomplemented NOR gates C45A, C45C, and C45E (that is, those gates not receiving the two's complement carries CE, −CE) are, for the four bit example of the present description, one input gates which serve as inverters for inverting the signals $-g67$, $+p67$, and $+g67$, respectively.

Because bits 6 and 7 are the low order bits, no change in the operands A and B effect the output signals from the group carry circuits C67A through C67E so that as indicated in FIG. 3, they maintain the constant output levels 0, 1, 0, 0, and 1, respectively. The signals from logic circuits C67B and C67D, however, reflect the input from the two's complement circuit CE of level II.

The level IV logic is comprised of the full first sum circuits S1(4) through S1(7) and the full second sum circuits S2(4) through S2(7). The first sum circuits receive half sum signals and the two's complement group carry signals, postscripted by B and D, as well as the common group carry signals postscripted by A and C. The first sum circuits are operative to form the difference A − B.

In a similar manner, the second sum circuits S2(4) through S2(7) receive the half sum signals and the group carry signals from the level III logic. The second sum circuits do not receive the complemented group carry signals, postscripted in B and D.

The second sum circuits receive the uncomplemented group carry signals, having postscripts A, C and E, from the level III logic circuits and together with the half sum signals form an initial sum which, when complemented, provides the second sum signals representing the difference B − A. The initial sum signals, S2(4)′, S2(5)′, S2(6)′, S2(7)′, output from the level IV sum circuits are complemented by inversion in level V to form the second sum signals S2(4), S2(5), S2(6), S2(7). Referring to FIG. 4, the level IV sum circuits S1(4) and S2(4) are shown as typical. The S1(4) circuit has as inputs to one of the two NOR gates −S40, +C45A, and +C45B. The other NOR gate receives the inputs −S41, +C45C, and +C45D. The two NOR gates have their outputs connected in common to form the logical OR function.

The S2(4) circuit includes a first NOR gate with inputs −S40 and +C45A. A second NOR gate receives inputs −S41, +C45C, and +C45E. The two NOR gates have their outputs connected in common forming a logical OR function.

The level V logic, as shown in FIG. 3, includes for the first sum circuits, the power drive circuit D which, for the particular example of the specification, are single input OR gates. For the second sum circuits, the level V logic includes power drive circuits DI which again are single input NOR gates which function to invert the initial sum signals thereby forming the one's complement of the outputs from the circuits S2(4) through S2(7).

OPERATION

The carry propagate adder and method of the present invention produces the dual differences, A − B and B − A, from two operands A and B. One's complement and two's complement arithmetic is employed in forming the dual outputs as explained with reference to the following four expressions:

$$B' = -B - 1 \quad \text{Exp. (1)}$$

$$B'' = -B = B' + 1 \quad \text{Exp. (2)}$$

$$A-B=(A+B')+1 \qquad \text{Exp. (3)}$$

$$B-A=(A+B')' \qquad \text{Exp. (4)}$$

where:

$B'$ = one's complement of $B$ $B''$ = two's complement of $B$ $(A+B')'$ = one's complement of $(A+B')$ Expression (1) above is by definition the one's complement of operand B and Expression (2) is by definition the two's complement of operand B. The difference A−B of Exp. (3) and the difference B−A of Expression (4) are the desired dual outputs from the adder. Comparing the right-hand side of Expressions (3) and (4) reveals that each includes the term (A+B') which is the sum of the operand A with the one's complement of operand B. The first difference A−B is formed by adding +1 to the quantity (A+B') and the second difference B−A is formed by taking the one's complement of the quantity (A+B').

The right-hand side of Expression (3) is shown equal to the left-hand side by substituting in the right-hand side of Expression (3) B' = −B−1 as derived from Expression (1). Similarly, the right-hand side of Expression (4) is readily shown equal to the left-hand side by substituting the value of B' given by Expression (1) as follows:

$$(A+B')' = -(A+B')-1 = -(A-B-1)-1 = B-A$$

The adder of the present invention operates to form the quantity A+B' employing carry propagate adder techniques. The group carries associated with the A−B difference are altered by the addition of a +1 value so that effectively the two's complement, B' +1, of B is added to the operand A. For the difference B−A, the group carries are uncomplemented, but the initial sum, A+B', is one's complemented by taking the inverted output.

As a specific example, operand A is 00001010 representing in binary notation a value of 10 and operand B is 00010100 representing in binary notation a value of 20. Using only the lower order 4 bits (1010 for A and 0100 for B), the quantity A+B' which appears in both Expression (3) and (4) above is 0101. In order to form the difference A−B, +1 is added to the quantity 0101 producing 0110. The difference B−A is formed by complementing 0101 forming 1010. Since operand B is greater than operand A, the latter calculation, B−A = 1010, is the desired one and is equal to 10 which is the difference (20−10) between operands A and B. If operand B is 00000100 which is equal to 4, then the first calculation A−B = 0110 is the desired one and is equal to 6 which is the difference (10−4) between operands A and B.

The determination of whether operand A or the operand B is greater is made, in one embodiment, in the LUCK unit 20 in FIG. 2. The comparison in LUCK unit 20 is executed in accordance with standard techniques, for example, by detecting which operand has the highest order 0 after the first highest order 1. In an alternate embodiment, adder 32 includes higher order bits 0 through 3 with means for detecting positive and negative signs. The difference producing the positive sign is the desired output and is employed to enable line 92.

Referring now to FIG. 3, and with reference to the previous example of operands A and B, the inputs *a*4 through *a*7 are 1010, respectively, and the inputs *b*4 through *b*7 are 1011 which are the inverse of 0100, respectively. The outputs at each of the various levels for each of the lines indicated in FIG. 3 for the above referenced operands A and B are summarized in the following Chart I.

CHART I

| | | | | |
|---|---|---|---|---|
| +a4=1 | −a4=0 | +b4=1 | −b4=0 | |
| +a5=0 | −a5=1 | +b5=0 | −b5=1 | |
| +a6=1 | −a6=0 | +b6=1 | −b6=0 | |
| +a7=0 | −a7=1 | +b7=1 | −b7=0 | |
| −g7=1 | +g7=0 | −p7=0 | +p7=1 | |
| −g6=0 | +g6=1 | −p6=0 | +p6=1 | |
| −g5=1 | +g5=0 | −p5=1 | +p5=0 | |
| −g4=0 | +g4=1 | −p4=0 | +p4=1 | |
| +p67=1 | −p67=0 | +g67=1 | −g67=0 | |
| +p45=1 | −p45=1 | +g45=1 | −g45=0 | |
| −S60=1 | −S61=0 | −S70=0 | −S71=1 | |
| −S40=1 | −S41=1 | −S50=1 | −S51=0 | |
| +C67A=0 | +C67B=1 | +C67C=0 | +C67D=0 | +C67E=1 |
| +C45A=1 | +C45B=1 | +C45C=0 | +C45D=0 | +C45E=0 |
| S1(7)=0 | | S2(7)=0 | | |
| S1(6)=1 | | S2(6)=1 | | |
| S1(5)=1 | | S2(5)=0 | | |
| S1(4)=0 | | S2(4)=1 | | |

While the adder and method of the present invention have been described with reference to 4 bit operands, the adder, of course, can be extended to any size as will be evident to those skilled in the art of carry propagate additions and in light of the teaching of the present specification.

While the invention has been described with reference to one function A−B of the functions *f*(A,B) and one function B−A of the functions *f*(B,A), the present invention applies to any functions *f*(A,B) and *f*(B,A) which are concurrently produced.

The tern "half-sum" as used in the specification and claims describes the full sum of a two-bit group where the 0 postscripted half-sums assume a 0 carry-in and the 1 postscripted half-sums assume a 1 carry-in. For example, −S40 assumes an 0 carry-in into the groups consisting of bits 4 and 5.

While the invention has been particularly shown and described with reference to preferred embodiments thereof, it will be understood by those skilled in the art that the foregoing and other changes in form and details may be made therein without departing from the spirit and scope of the invention.

I claim:

1. A binary carry propagate adder for forming the algebraic sums of operands A and B comprising, first means for generating a +1 constant, second means for forming propagate, generate, carry, and half-sum signals from said +1 constant, from the operand A and from the one's complement, B', of the operand B, third means responsive to said signals to form the initial sum A+B', fourth means responsive to said signals to form the sum A+B'+1 equal to the difference A−B, and fifth means operating concurrently with said fourth means for forming the one's complement, (A+B')', of said initial sum A+B' to form the difference B−A whereby the differences A−B and B−A are concurrently formed.

2. A data processing system including apparatus for storing operands A and B, said system including a binary carry propagate adder for forming the algebraic sums of operands A and B comprising, first means for generating a +1 constant, second means for forming propagate, generate, carry, and half-sum signals from said +1 constant, from the operand A and from the one's complement, B', of the operand B, third means responsive to said signals to form the initial sum A+B', fourth means responsive to said signals to form the sum A+B'+1 equal to the difference A—B, and fifth means operating concurrently with said fourth means for forming the one's complement, (A+B')', of said initial sum A+B' to form the difference B—A whereby the differences A—B and B—A are concurrently formed, and said system including a comparator means for determining which of the operands A and B is greater, and means responsive to said comparator means for selecting the differences A—B if A is greater and selecting the difference B—A if B is greater.

3. A data processing system, including apparatus for storing operands A and B and for providing input signals representing the operand A and for providing input signals representing the one's complement, B', of the operand B, said system including an adder comprising means for phase-splitting said input signals to form two-phase input signals, means responsive to said two phase input signals for generating bit generate, bit propagate, group generate, and group propagate signals, means for generating two's complement carry signals, means responsive to said group propagate and said group generate signals and responsive to said two's complement carry signals to form complemented group carry signals, means responsive to said group propagate and said group generate signals to generate uncomplemented group carry signals, means responsive to said bit generate and bit propagate signals for generating half sum signals, means responsive to said half-sum signals and said complemented and uncomplemented group carry signals to form first sum signals representing the difference A—B, means responsive to said half-sum signals and said uncomplemented group carry signals to form initial sum signals, means for one's complementing said initial sum signals to form second sum signals representing the difference B—A.

4. The system of claim 3 further including, a comparator for comparing the operands A and B to determine which is greater, and means responsive to said comparator for selecting said first sum signals if A is greater than B and selecting said second sum signals if B is greater than A.

5. The system of claim 4 further including means responsive to said comparator for selecting said first sum signals if A equals B.

6. The system of claim 3 further including an instruction unit, storage units for storing floating point instructions, and control means for fetching the floating point instructions to the instruction unit and operands A and B to the apparatus for storing operands A and B, said operands A and B including sign, mantissa, and exponent portions, said system including means for shifting the mantissa portions of said operands A and B into alignment in response to the difference A—B if A is greater than B or in response to the difference B—A if B is greater than A.

7. A data processing system, including apparatus for storing operands A and B and for providing input signals representing the operand A and for providing input signals representing the one's complement, B', of the operand B, said system including an adder comprising, a first level of logic including means for phase-splitting said input signals to form two phase input signals, a second level of logic including means responsive to said two phase input signals for generating bit generate, bit propagate, group generate, and group propagate signals, and including means for generating two's complement carry signals, a third level of logic including means responsive to said group propagate and said group generate signals and responsive to said two's complement carry signals to form complemented group carry signals, including means responsive to said group propagate and said group generate signals to generate uncomplemented group carry signals, and including means responsive to said bit generate and bit propagate signals for generating half-sum signals, a fourth level of logic including means responsive to said half-sum signals and said complemented and uncomplemented group carry signals to form first sum signals representing the difference A—B, and including means responsive to said halfsum signals and said uncomplemented group carry signals to form initial sum signals, and a fifth level of logic including means for one's complementing said initial sum signals to form second sum signals representing the difference B—A and including means for powering said first sum signals representing the difference A—B.

8. The system of claim 7 further including means for ingating said operand A and the inverse B' of operand B into said first level of logic where A and B' each include four bits represented by the input signals $a4, \ldots, a7$ and $b4, \ldots, b7$, respectively.

9. The system of claim 7 wherein said logic levels include a plurality of NOR/OR gates having outputs connected in common to form logical OR functions.

10. In a data processing system which stores data and instructions and has a plurality of units for executing the instructions including a carry propagate adder operated in accordance with algorithms for forming the algebraic sums of operands A and B, the improvement comprising the sequential steps of, generating, in response to input signals representing operand A and the one's complement, B', of operand B, bit propagate, bit generate, group propagate, and group generate signals, and generating carry signals, generating, in response to said bit propagate and bit generate signals, half sum signals and concurrently generating, in response to said group propagate, group generate and carry signals, uncomplemented group carry signals and complemented group carry signals, logically combining said complemented and uncomplemented group carry signals and said half sum signals to form first sum signals representing the difference A—B and concurrently logically combining said uncomplemented group carry signals and said half sum signals to form initial sum signals, and one's complementing said initial sum signals to form second sum signals representing the difference B—A.

11. The method of claim 10 further including the steps of, comparing the operands A and B to determine which is greater, selecting the difference A—B if A is greater than B and selecting the difference B—A if B is greater than A.

* * * * *